Dec. 29, 1959  J. LOVELL  2,919,084
STEERING MECHANISM FOR AIRCRAFT LANDING GEAR
Filed Sept. 17, 1956  3 Sheets-Sheet 1

INVENTOR.
JACK LOVELL
BY
ATTORNEY

INVENTOR.
JACK LOVELL
BY
ATTORNEY

INVENTOR.
JACK LOVELL
BY
ATTORNEY

United States Patent Office 2,919,084
Patented Dec. 29, 1959

2,919,084

STEERING MECHANISM FOR AIRCRAFT LANDING GEAR

Jack Lovell, Chagrin Falls, Ohio, assignor to Cleveland Pneumatic Industries, Inc., Cleveland, Ohio, a corporation of Ohio Application September 17, 1956, Serial No. 610,260

8 Claims. (Cl. 244—50)

This invention relates to power steering and more particularly to a power steering mechanism for an aircraft landing gear which permits full swiveling of the aircraft wheel without disconnecting the steering mechanism.

It is an important object of this invention to provide a full swivel steering mechanism which does not require any mechanical disconnections or rotary fluid seals.

It is another important object of this invention to provide a full swiveling steering mechanism which can utilize a simple piston and cylinder fluid motor for the source of power in which there are no eccentric loads on the motor bearings.

It is still another object of this invention to provide a full swivel steering structure which can be easily manufactured which will have a long trouble free service life.

Further objects and advantages will appear in the following description and drawings, wherein.

In modern aircraft, it is very desirable to provide a ground steering mechanism which permits the swiveling of the steerable wheel through a full 360° so that the aircraft can be maneuvered in confined areas such as on shipboard and the like. It is not necessary to provide power steering through the entire 360° since an external power source, such as the ground handling tractor or the like, is used to swivel the wheel and also to move the aircraft. However, it is desirable to provide power steering through relatively large angles so that the pilot can easily maneuver the aircraft when it is moving under its own power. My steering mechanism meets the above requirements, while being structurally simple so that the manufacturing and maintenance costs will be at a minimum.

Figure 2:
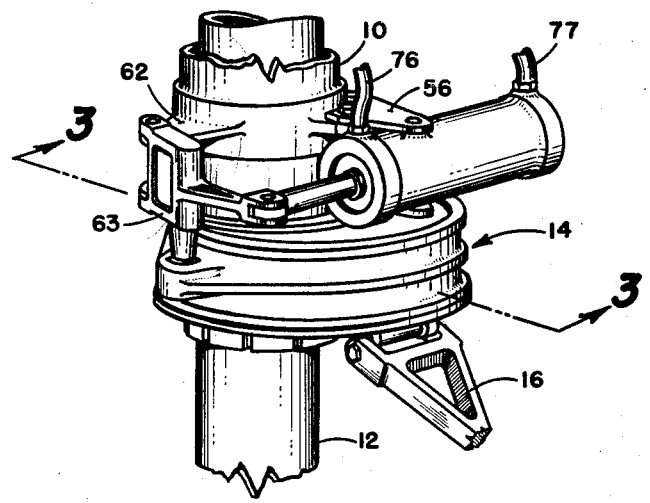
Figure 2 is an enlarged fragmentary perspective view of the steering mechanism shown in Figure 1.
Figure 1:
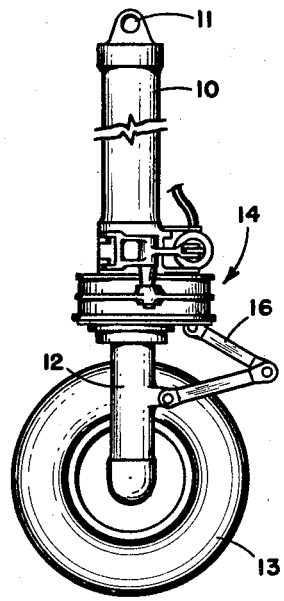
Figure 1 is aside elevation showing a typical landing gear incorporating a steering mechanism according to this invention.

Referring to the drawings, Figure 1 discloses a typical landing gear having a cylinder 10 formed with a mounting lug 11 with which the cylinder is mounted on the frame of an aircraft (not shown). A piston 12 provided with a ground engaging wheel journaled on the lower end thereof projects into the cylinder 10 and is axially and rotationally movable relative thereto. A steering mechanism shown generally at 14 is mounted on the cylinder 10 and is connected to the piston 12 by conventional torque arms 16. Through these arms the rotation produced in the steering mechanism 14 is transmitted to the piston 12.

Figure 4:
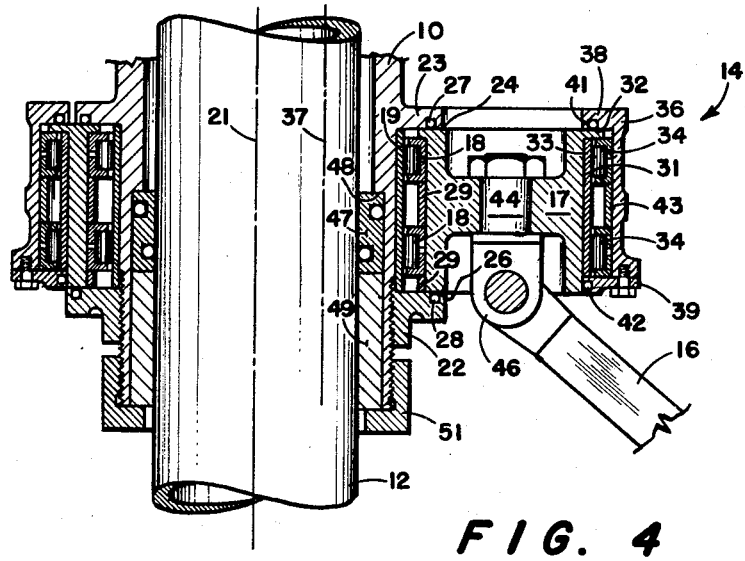
Figure 4 is a fragmentary longitudinal section showing the details of the eccentric ring structure.
Figure 5:
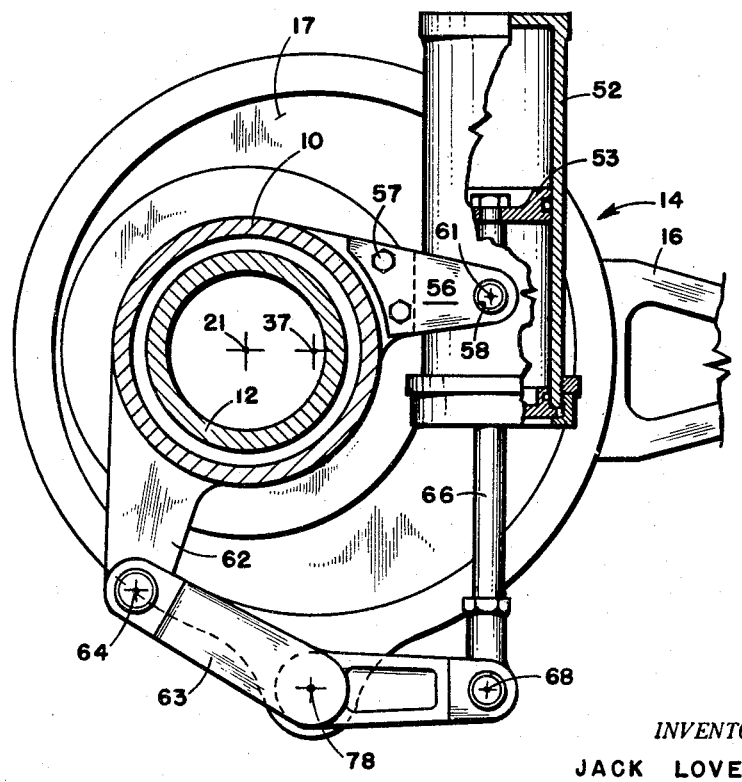
Figure 5 is a plan view partially in section taken along 5—5 of Figure 3.

Referring now to Figures 4 and 5, the steering mechanism 14 includes an eccentric ring 17 journaled on the cylinder 10 by means of anti-friction roller bearings 18. Because the anti-friction bearings require hard precision races, I prefer to utilize a bearing sleeve 19 which is mounted on the cylinder 10 and forms the inner race of the bearings 18. The eccentric ring 17 is therefore journaled for rotation relative to the cylinder 10 around its central axis 21 on the bearings 18. A mounting nut 22 is threaded onto the lower end of the cylinder 10 and axially positions the bearing sleeve 19 against a flange or stop shoulder 23 formed in the cylinder 10. The eccentric ring 17 is formed with opposed end faces 24 and 26 which are engaged by dirt seals 27 and 28 mounted on the mounting nut 22 and flange 23 respectively. The mounting nut 22 and flange 23 co-operate to axially position the eccentric ring 17 on the cylinder 10 and spacers 29 may be used to axially position the bearings 18. I prefer to use two axially spaced bearings 18 of the roller or needle type so that the ring 17 will have axially spaced support which prevents it from canting or tipping.

The periphery of the eccentric ring 17 is formed with a cylindrical surface 31 and radially projecting flange 32. A bearing sleeve 33 is positioned around the cylindrical surface 31 and forms the inner race of the outer bearings 34. An eccentric collar 36 is journaled on the bearings 34 for rotation around an eccentric axis 37 which is spaced from and parallel to the central axis 21. The eccentric collar 36 is formed with an inwardly projecting flange 38 which projects over the flange 32 and prevents downwardly axial motion of the eccentric collar 36 relative to the eccentric ring 17. An annular cap 39 bolted on the lower end of the eccentric collar 36 engages the bearing sleeve 33 and holds it against the flange 32 thereby preventing upward movement of the eccentric collar 36 relative to the eccentric ring 17. Seals 41 and 42 are mounted on the eccentric collar 36 and annular cap 39 respectively and engage the eccentric ring 17 to keep dirt and the like out of the bearings 34. Again, I prefer to use a pair of roller bearings 34 held in an axially spaced relationship by a spacer 43 to provide axially spaced support for the eccentric collar 36. A mounting stud 44 is connected to the eccentric ring 17 and provides a mounting lug on which the upper end of the torque arm 16 is mounted.

In a conventional manner, the cylinder 10 and piston 12 co-operate to form the conventional fluid spring which urges the piston downwardly relative to the cylinder 10 and resiliently supports the weight of the aircraft. A gland member 47 is positioned between the cylinder 10 and piston 12 and is held against a shoulder 48 by a sleeve bearing 49 which is held in position by a gland nut 51. The sleeve bearing 49 provides a lateral support for the piston 12 and the gland member 47 prevents leakage of fluid out along the piston 12.

Figure 3:
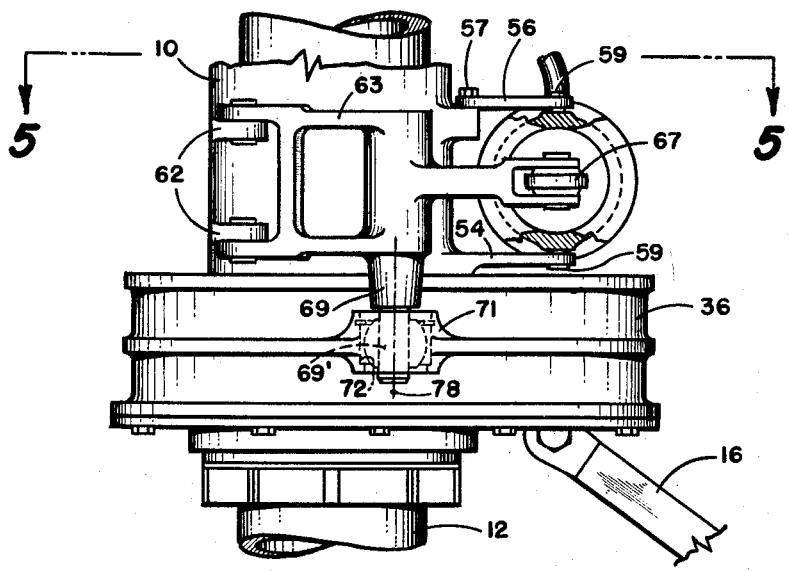
Figure 3 is a side elevation of the steering mechanism shown in Figure 2 taken along 3—3 of Figure 2.

I prefer to use a steering motor comprising a cylinder 52 and a co-operating piston 53 which are axially movable relative to each other under the influence of fluid under pressure supplied through pressure hoses 76 and 77. The pressure hoses 76 and 77 are preferably connected to a source of pressure fluid through a valve of the type shown in the copending application of Walter H. Hogan, Serial No. 489,987, filed February 23, 1955. The cylinder 52 extends transversely of the cylinder 10 and is pivotally connected thereto between a pivot lug 54 formed on the cylinder 10 as shown in Figure 3 and a removable pivot plate 56 which is mounted on the cylinder 10 by screw fasteners 57. The pivot lug 54 and pivot plate 56 are each formed with co-axial bores 58 in which are journaled trunnions 59 formed on the cylinder 52. Thus, the fluid cylinder 52 is mounted on the main cylinder 10 for limited pivotal motion around an axis 61 which is spaced from and parallel to the central axis 21.

The cylinder 10 is also provided with a pair of axially spaced projections 62 on which a rocker arm 63 is pivotally connected for rotation around still another axis 64 which is spaced from any parallel to the central axis 21. The axially spaced pivotal connections between the rocker arm 63 and the cylinder 10 provide a structure which prevents twisting of the rocker arm when eccentric loads are applied thereto and prevents motion thereof relative to the cylinder 10 except around the axis 64. The outer end of the rocker arm 63 is pivotally connected to a piston rod 66 which is mounted on the piston 53 for rotation around an axis 68. I prefer to use a spherical bearing 67 for the connection between the rocker arm 63 and the piston rod 66 so that only forces along the axis of the piston rod can be transmitted.

The rocker arm 63 is formed with a depending projection 69 (best shown in Figure 3) formed with a shafted portion 69' which projects into a spherical bearing 72 mounted in a lug 71 formed on the eccentric collar 36. The spherical bearing 72 is used to connect the projection 69' to the connecting lug 71 on the eccentric collar 36, and is arranged so that it can slide axially along the projection 69' so that it cannot transmit any forces between the eccentric collar 36 and the rocker arm 63 other than forces in the plane of the eccentric ring 17 and eccentric collar 36 which is perpendicular to the central axis 21. Therefore, if there is any twisting or rocking of the rocker arm 63 it will not cause any forces to be applied to the eccentric collar 36 other than the forces in the previously mentioned plane.

In operation, fluid under pressure is supplied through one or the other of the pressure hoses 76 or 77 which connect the opposite sides of the piston 53. If fluid under pressure is supplied through the pressure hose 76 the hose 77 is connected to the reservoir return and a force is developed urging the piston rod 66 in a direction toward the cylinder 52. This applies a force to the rocker arm 63 urging it in a counter clock-wise direction as shown in Figure 5. Assuming that the elements are in the position of Figure 5, such a force applied by the piston rod 66 will cause a moment to be applied to the eccentric ring 17 and cause it to rotate in a counter clock-wise direction about the central axis 21. The moment tending to turn the eccentric ring 17 is a function of the perpendicular distance between the line through the axis 78 and the axis 37 from the central axis 21 times the magnitude of the force through the eccentric ring axis 37. Conversely, fluid under pressure supplied to the pressure hose 77 and the hose 76 connected to the reservoir return a force which is developed on the piston 53 urging it in a direction which causes rotation of the rocker arm 63 in a clock-wise direction and causes the eccentric ring 17 to rotate in a clock-wise direction. The elements would normally be arranged so that they are in the position of Figure 5 when the wheel 13 is in the straight ahead position at which time the plane of wheel is aligned with the major axis of the aircraft. This is desirable since the maximum torque is produced when the elements are in this position because there is a maximum piston movement for a given amount of rotation of the wheel 13. Normally the hydraulic fluid control system is arranged so that the two hoses 76 and 77 are connected together through a flow restriction when the device is not providing power steering. The structure disclosed in the above cited copending application is adequate for this purpose. By connecting the two hoses 76 and 77 through a flow restriction, damping is achieved as the piston 53 moves back and forth in the cylinder. Since the amount of energy absorbed is a function of the amount of hydraulic fluid passing through the flow restriction which is in turn a function of the piston movement, maximum damping is provided when the wheel 13 is in the straight ahead position. Again, since shimmying of the wheel 13 tends to occur more when the wheel 13 is in this position, an optimum arrangement is provided since maximum damping is provided at this time.

Because the rocker arm 63 is carried by the main cylinder 10 and rotates around the pivot axis 64, it determines the locus of the movement of the axis 78, so that the eccentric collar 36 moves through a fixed path as the eccentric ring 17 rotates around the central axis 21. For the same reason, the locus of the axis 68 is determined so that the only side loads on the bearings of the fluid motor are the loads which are necessary to overcome friction and cause the cylinder 52 to rotate around the pivot axis 61.

Figure 6A:
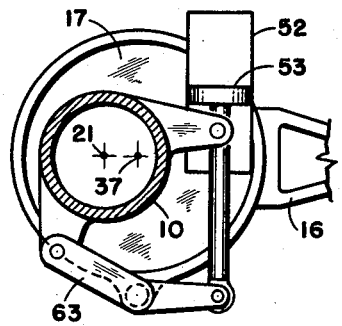
Figure 6a through 6f are schematic views showing the position of the elements as the steering mechanism progressively rotates through a full 360°.
Figure 6B:
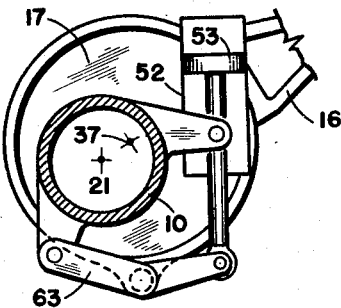
Figure 6C:
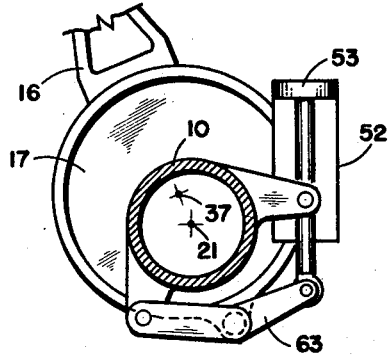
Figure 6D:
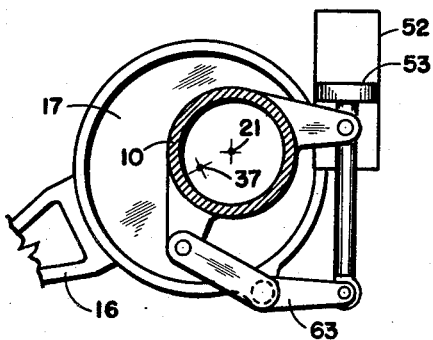
Figure 6E:
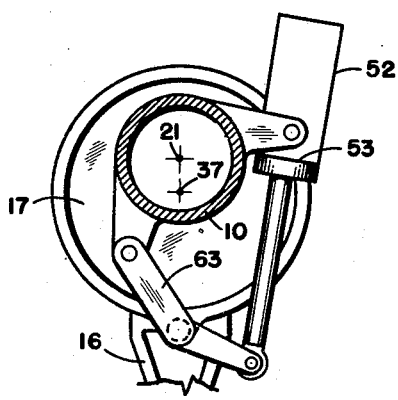
Figure 6F:
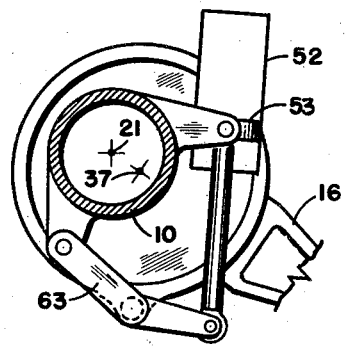

In Figure 6a through 6f, the various elements are shown in progressive positions as the eccentric ring 17 rotates through a full 360°. It should be understood that in this full rotation, the piston 53 makes a complete cycle of motion within the cylinder 52 and therefore passes through two dead center positions, therefore, it is impossible to provide power steering torque through the full 360° with a single cylinder. If 360° of power steering were desired, it would be necessary to provide two or more cylinders. In the illustrated mechanism, full swiveling is accomplished by an external power source such as the ground handling tractor. In Figure 6a the elements are shown in the same position as Figure 5 which would be the neutral position. Rotation of the eccentric ring 17 in a counter clock-wise direction causes the elements to move from the position of Figure 6a to the position of Figure 6b. Since the torque arms 16 are mounted on the eccentric ring 17, the position of the torque arms 16 clearly shows the position of the eccentric ring 17 as it rotates. It should be noted that as the mechanism rotates from the position of Figure 6a to the position of Figure 6b, the piston 53 moves upwardly in the cylinder 52. From the position of Figure 6b the elements move onto the position of Figure 6c which is top dead center position wherein the piston 53 has reached one end of its stroke. It should be understood that movement of the various elements would not stop in each of the positions shown, but would rather progressively move through each position as the eccentric ring 17 rotates. In the position of Figure 6c, the eccentric ring 17 has rotated through more than 90° from the position of Figure 6a. Therefore, one half of the piston stroke theoretically could cause rotation of the eccentric through more than 90°. It should be understood, however, that the torque efficiency drops as the piston approaches its dead center position and that usable torque will not be produced through this full range. However, the usable torque range is a function of the theoretical torque range so the fact that the theoretical torque range is over 90° in one direction indicates that the usable or practical torque range will be large. From Figure 6c the eccentric ring 17 can rotate onto the position of Figure 6d at which time the piston 53 moves back to the neutral position in the cylinder 52. From this position, the eccentric ring can move to the position of Figure 6e which is bottom dead center position of the piston 53. Continued rotation of the eccentric ring 17 causes the elements to move to the position of Figure 6f and still further rotation will cause the elements to return to the position of Figure 6a. It is therefore apparent that the mechanism permits full swiveling of the wheel 13 because the eccentric ring 17 can rotate freely through a full 360°. This is possible without disconnection of any of the linkage as has been necessary in most previous designs.

From the position of Figure 6a torque can be theoretically produced to cause rotation of the eccentric ring in a counter clock-wise direction to the position of Figure 6c as mentioned previously. Also, rotation of the eccentric ring 17 can be caused by the fluid motor in the clockwise direction to the position of Figure 6e. Therefore, theoretical torque can be produced from the position of Figure 6e through the neutral position to the position of Figure 6c which is more than 180°. Again, even though practical steering torques cannot be produced through this full range, a large practical steering range is provided since such practical range is a function of the theoretical torque range.

It is desirable to mount the cylinder 52 on the main cylinder 10 so that it is as close as possible to the eccentric collar 36, so that the force moments created by the axial forces of the piston rod 66 and the connection of the spherical bearing 72 on the rocker arm 63 will be as small as possible for any given force applied by the piston rod 66. If these moments created by the two forces are reduced by keeping the lines of action of the two forces in planes as close together as possible, it is possible to reduce the size and weight of the rocker arm 63 while still maintaining sufficient strength. It is also desirable to form the rocker arm 63 so that the pivot axis 78 is not directly in line between the pivoted axes 64 and 68, but rather is positioned on the side of a line through the axes 64 and 68 remote from the central axis 21. The preferred arrangement is shown in Figure 5 wherein the pivot axis 64 is relatively close to the central axis 21. This creates a two fold advantage in that it brings the pivoted axis 64 radially in toward the center of the strut and results in a smaller envelope and also causes the piston axis 78 to move in an arc which does not tend to be aligned with the central axis 21. It is this action which causes the eccentric collar 36 to rotate to a limited degree around the central axis 21 as the mechanism operates and results in a theoretical torque range between the two dead center positions which is greater than 180°, as previously discussed. Because the cylinder 52 rotates around the pivot axis 61, through only a small angle in either direction from the neutral position, it is possible to use simple flexible pressure hoses 76 and 77 to connect the cylinder to the hydraulic system. This simplified structure without swivel hydraulic connections is highly important as it reduces the initial and maintenance costs of the device. In order to provide full swiveling, the proportions should be arranged so that the distances between the axes 21 and 64 plus the distance between the axes 64 and 78 is greater than the distance between the axes 31 and 37 plus the distance between the axes 37 and 78. The proportions should also be arranged so that the difference between the distance between the axes 21 and 64 and the distance between the axes 64 and 78 is less than the difference between the distance between the axes 21 and 37 and the distance between the axes 37 and 78. If both of these conditions are met, a full swivel device with a 360° cycle will result. If the various requirements of a given installation would be better filled, it is possible to connect the fluid motor between the main sylinder 10 and the eccentric collar 36 because the locus of movement of the eccentric collar is determined by the rocker arm 63 and the eccentric ring 17.

Those skilled in the art will recognize that the above described structure meets all of the rigorous requirements of aircraft steering mechanisms, and yet utilizes a mechanically simple device which will be dependable in operation for long periods of time with a minimum amount of maintenance. Also, since most of the elements are formed with cylindrical surfaces, the manufacture of the mechanism will use primarily turning and boring operation. Therefore, the cost of the device will be at a minimum.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. An aircraft steering mechanism comprising a fixed element, an eccentric ring journaled on said fixed element for rotation relative thereto around a first axis, a collar journaled on said eccentric ring for rotation relative thereto about a second axis spaced from said first axis, a rocker arm pivotally connected to said fixed element for rotation relative thereto about a third axis spaced from said first and second axes, pivot means connected to said collar and rocker arm for rotation about a fourth axis spaced from said second and third axes, said pivot means arranged and constructed in a manner causing it to transmit forces only in a plane perpendicular to said first axis through said collar, and means operably connected to said rocker arm controlling the rotation thereof around said third axis and thereby controlling rotation of said eccentric ring about said first axis.

2. An aircraft steering mechanism comprising a fixed element, an eccentric ring journaled on said fixed element for rotation relative thereto around a first axis, a collar journaled on said eccentric ring for rotation relative thereto about a second axis spaced from said first axis, a rocker arm pivotally connected to said fixed element for rotation relative thereto about a third axis spaced from said first and second axes, pivot means connected to said collar and rocker arm for relative rotation about a fourth axis spaced from said second and third axes, motor means including first and second relatively movable members one of which is pivotally connected to said fixed element for rotation relative thereto about a fifth axis spaced from said first and third axes, and the other of which is pivotally connected to said rocker arm whereby said motor means imparts rotation to said rocker arm and in turn imparts rotation to said eccentric ring.

3. A steering mechanism comprising a fixed element, an eccentric ring journaled on said fixed element for rotation relative thereto around a first axis, a collar journaled on said eccentric ring for rotation relative thereto about a second axis spaced from said first axis, a rocker arm pivotally connected to said fixed element for rotation relative thereto about a third axis spaced from said first and second axes, pivot means connected to said collar and rocker arm for rotation about a fourth axis spaced from said second and third axes, and motor means including a pair of elongated members capable of relative longitudinal motion one of which is pivotally connected to said fixed element for rotation relative thereto through a limited angle about a fifth axis spaced from said third axis, and the other of which is pivotally connected to said rocker arm whereby said motor means imparts rotation to said rocker arm and in turn imparts rotation to said eccentric ring.

4. A steering mechanism comprising a fixed cylindrical element, an eccentric ring journaled around said cylindrical element for rotation relative thereto about the central axis thereof, an eccentric collar journaled on said eccentric ring for rotation relative thereto about a first eccentric axis spaced from and parallel to said central axis, spaced pivot means on said cylinder, a rocker arm pivotally mounted on said pivot means at a point spaced from said eccentric ring for movement relative to said fixed element only around a second eccentric axis spaced from and parallel to said other axes, pivot means connecting said rocker arm and eccentric collar capable of transmitting forces only in the plane of said eccentric collar, and motor means spaced from said eccentric collar and eccentric ring in a direction parallel to said central axis pivotally connected between said rocker arm and fixed element effecting rotation of said rocker arm relative to said fixed element and in turn rotation of said eccentric ring relative to said fixed element.

5. A steering mechanism comprising a fixed cylindrical element, an eccentric ring journaled around said cylindrical element for rotation relative thereto about the central axis thereof, an eccentric collar journaled on said eccentric ring for rotation relative thereto about a first eccentric axis parallel to said central axis, a rocker arm pivotally mounted on said cylindrical element at a point spaced from said eccentric ring for movement relative to said cylindrical element only around a second eccentric axis parallel to all of the other of said axes, pivot means connecting said rocker arm and eccentric collar capable of transmitting forces only in the plane of the eccentric collar, and a fluid motor spaced from said eccentric collar and eccentric ring in a direction parallel to said central axis including co-operating piston and cylinder members relatively movable in response to fluid under pressure, one of said members being pivotally connected to said rocker arm and the other of said members being pivotally connected to said cylindrical element whereby relative motion between said members causes rotation of said rocker arm and said eccentric ring.

6. A steering mechanism comprising a fixed element, first eccentric element journaled on said fixed element for rotation around a first axis, a second eccentric element journaled on said first eccentric element for rotation relative thereto about a second axis spaced from and parallel to said first axis, a link pivotally connected to said fixed element for rotation relative thereto about a third axis spaced from and parallel to said first and second axes, pivot means connecting said link and second eccentric element for relative rotation around a fourth axis spaced from and parallel to the other of said axes, and motor means pivotally connected between said fixed element and link effecting rotation of said link around said third axis, the distance between said first axis and said second axis plus the distance between said second axis and said fourth axis being less than the distance between said first axis and third axis plus the distance between said third axis and fourth axis and the difference in the distance between said first axis and said third axis and the distance between said third axis and fourth axis being less than the difference in the distance between said second axis and said fourth axis and the distance between said first axis and said second axis.

7. A steering mechanism comprising a fixed element, first eccentric element journaled on said fixed element for rotation around a first axis, a second eccentric element journaled on said first eccentric element for rotation relative thereto about a second axis spaced from and parallel to said first axis, a link pivotally connected to said fixed element for rotation relative thereto about a third axis spaced from and parallel to said first and second axes, pivot means connecting said link and second eccentric element for relative rotation around a fourth axis spaced from and parallel to the other of said axes, and motor means pivotally connected between said fixed element and link affecting rotation of said link around said third axis, the distance between said first axis and said second axis plus the distance between said second axis and said fourth axis being less than the distance between said first axis and third axis plus the distance between said third axis and fourth axis, and the distance between said first axis and said third axis minus the distance between said third axis and fourth axis being less than the distance between said second axis and said fourth axis minus the distance between said first axis and second axis.

8. A steering mechanism comprising a fixed cylindrical element, an eccentric ring journaled around said cylindrical element for rotation relative thereto about the central axis thereof, an eccentric collar journaled on said eccentric ring for rotation relative thereto about a first eccentric axis parallel to said central axis, pivot means on said cylinder spaced from each other in a direction parallel to said central axis, a rocker arm pivotally mounted on said pivot means at a point spaced from said eccentric ring in a direction parallel to said central axis for movement relative to said fixed element only around a second eccentric axis parallel to the other of said axes, pivot means connecting said rocker arm and eccentric collar capable of transmitting forces only in the plane of said eccentric collar, and motor means spaced from said eccentric collar and eccentric ring pivotally connected between said rocker arm and fixed element effecting rotation of said rocker arm relative to said fixed element and in turn rotation of said eccentric ring relative to said fixed element, said pivot means being on the side of a line through said second eccentric axis and the connection of said motor means and rocker arm remote from said central axis.

References Cited in the file of this patent
UNITED STATES PATENTS 2,759,687      Hogan _____ Aug. 21, 1956

FOREIGN PATENTS 119,774      Sweden _____ Sept. 30, 1947
625,228      Great Britain _____ June 23, 1949